United States Patent [19]

Kalbfleish

[11] 4,230,154
[45] Oct. 28, 1980

[54] COMBINED BALL AND THROTTLE VALVE

[76] Inventor: Adolphe W. Kalbfleish, Box 64, Jeannette, Pa. 15644

[21] Appl. No.: 969,721

[22] Filed: Dec. 15, 1978

[51] Int. Cl.³ .......................... F16K 43/00; F16K 1/22
[52] U.S. Cl. ............................. 137/614.17; 251/307; 251/315
[58] Field of Search ............................ 137/614.17, 377; 251/315, 307, 304

[56] References Cited

U.S. PATENT DOCUMENTS

| 2,754,846 | 7/1956 | Ray | 137/614.17 |
|---|---|---|---|
| 2,809,662 | 10/1957 | Ray | 137/614.17 |
| 2,885,179 | 5/1959 | Hartman | 251/315 |
| 3,144,040 | 8/1964 | White | 137/315 |
| 3,707,161 | 12/1972 | Crawford | 137/614.17 |
| 3,860,032 | 1/1975 | Rogers | 137/614.17 |
| 4,006,881 | 2/1977 | Gaillard | 251/315 |
| 4,111,229 | 9/1978 | Christian | 137/614.17 |
| 4,175,580 | 11/1979 | Kalbfleisch | 137/315 |

FOREIGN PATENT DOCUMENTS 645734  7/1962  Canada ................... 137/614.17

Primary Examiner—Alan Cohan
Assistant Examiner—A. Michael Chambers
Attorney, Agent, or Firm—Parmelee, Miller, Welsh & Kratz

[57] ABSTRACT

A combination valve assembly is provided for controlling fluid flow through a housing within which a ball element is operatively positioned and has a throttle valve element operatively mounted within its bore. The ball element has a latching slot to receive a latching spline carried on the inner end of an outer sleeve-like stem that extends through the side wall of the housing. The throttle valve is operated by a stem extending inwardly along the outer sleeve stem which operates the ball element. The throttle valve element may be set for any desired size of fluid control opening, and may have either a bubble or a sealed closing-off fit within the bore of the ball element.

5 Claims, 4 Drawing Figures

COMBINED BALL AND THROTTLE VALVE

BRIEF SUMMARY OF THE INVENTION

This invention pertains to a ball valve construction which, in addition to normal operation of its valve ball element, has a throttle or butterfly valve element which may be adjusted apart from the operation of the valve ball element to provide a desired throttling action of flow-through fluid. A phase of the invention deals with a combined ball and throttle valve construction wherein its valve ball element operatively contains a throttle element.

DETAILED DESCRIPTION

Figure 1:
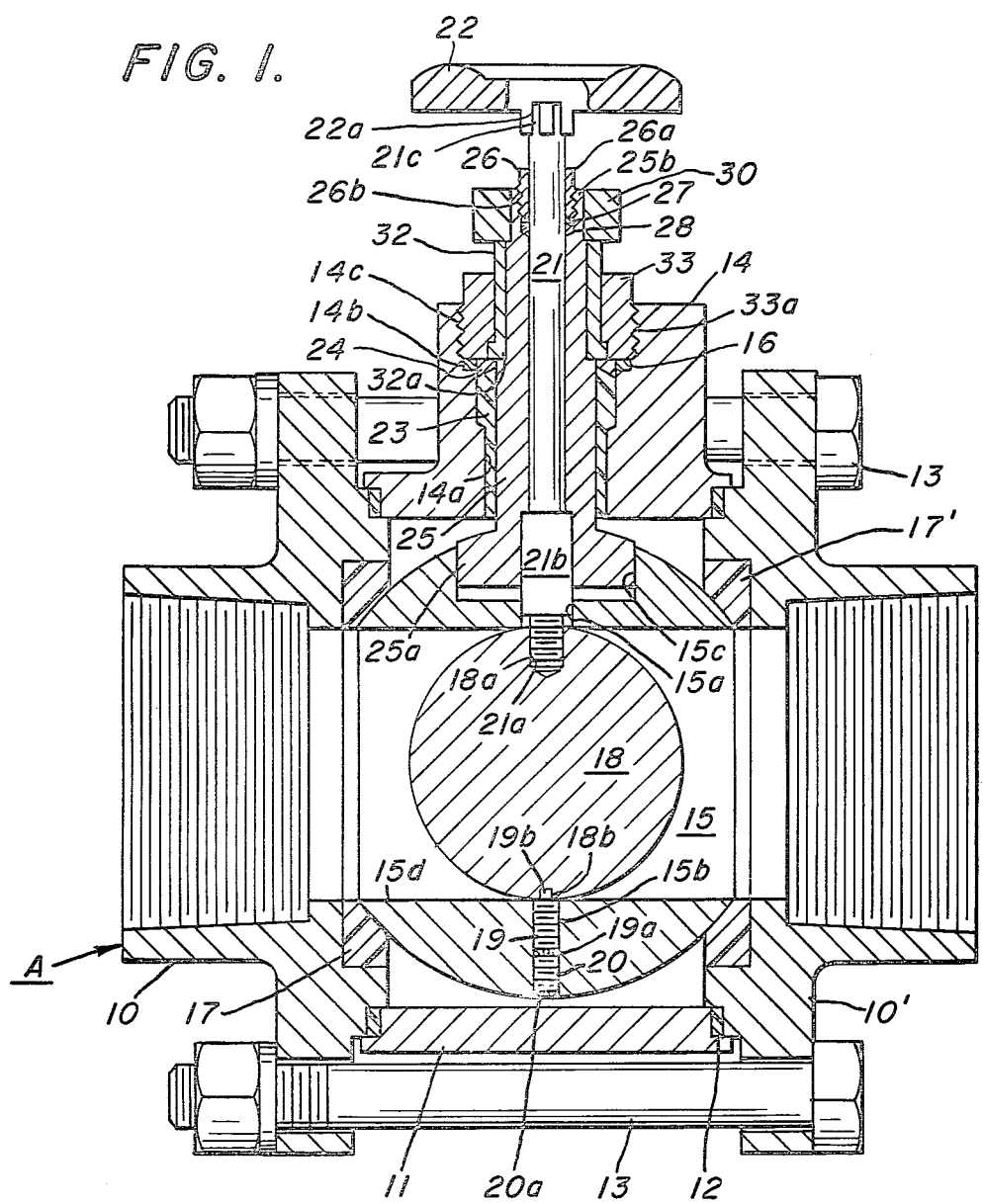
FIG. 1 is a side section in elevation showing a valve constructed in accordance with the invention with its parts in a mounted, fully operative positioning.

Although there have been many attempts by those skilled in the art to provide a practical ball valve with throttling characteristics, so far as known at the present time, valves so produced have been limited to low pressure utilizations. Even in such utilizations, they have not been too satisfactory from the standpoint of their operation. It has been determined that the throttling of the valve ball of a ball valve construction by limiting the size of its opening will produce a somewhat turbulent elliptical type of flow that is not only extremely erosive as to surfaces and edges of the ball, but particularly damaging to gasket material. In the latter connection, depending on the location of the gaskets, they may become dislodged.

It has been further determined that a conventional ball valve cannot, as a practical matter, be used with superheated steam in a throttling type of operation. Attempts have been made to change the shape of the ball to provide a linear edge and thus, to eliminate the elliptical type of exposed flow restricting opening. This not only greatly complicates the construction, but has made the cost prohibitive.

There has been an urgent need in the art for a so-called throttling type of ball valve and also, for one which has a memory from the standpoint that the desired size of an open flow passageway may be retained irrespective of whether or not the valve ball element is in a closed or open position in its housing. The present invention has been devised to find a practical solution to the problem presented and meet such need.

In accordance with the present invention, a separate butterfly throttle valve element 18, shown of substantially planar circular or disc-like shape, is mounted on an inner, rod-like, central operating stem 21 which extends concentrically, axially along an outer, sleeve-like stem 25 that is adapted to separately control the operation of a valve ball element 15. Both stems 21 and 25 are shown mounted and sealed within the same gland that is provided in an open boss 14 through the side of a central housing body part 11. The stem 25 operatively carries the valve ball element 15 within a housing assembly A, and the stem 21 operatively carries the throttle valve element 18 to extend fully normal to and across within a through-passageway defining bore 15d of the valve ball element 15. Also as shown, the bore 15d is of uniform uninterrupted diameter along its extent and fully open at its ends to the passageway defined by housing parts 10 and 10'.

Using a construction of the invention, the butterfly throttle valve element 18 may be employed to provide a so-called "bubble" type of closing operation (FIG. 1) or a fully sealed type of operation, as may be required for a particular usage.

Referring to FIG. 1 of the drawings, demountable housing assembly A, by way of illustration, is shown as having three interfitting housing parts 10, 10' and 11 that define a through-extending fluid passage therethrough. A pair of similar end connector housing parts 10 and 10' have a cooperative interfitting relation with an intermediate or central body part 11. A pair of relatively planar surface Teflon rings 12 provide a seal between these parts when they are tightened-down to form a sealed-off unitary construction by a group of circumferentially spaced-apart nut and bolt assemblies 13. The assemblies 13 are adapted to extend through aligned pairs of equally spaced lug projections of the outer housing parts 10 and 10'. The central part 11 provides an open chamber portion for receiving ball valve element 15 therein which, as shown is operatively carried by a pair of oppositely positioned Teflon sealing rings 17. It will be noted from FIG. 1 that each ring 17 fits within an angular-shaped concentric groove portion or recess in an associated end housing member 10 or 10'. This part of the construction may be more or less conventional. The ball element 15 is shown operatively positioned for rotative opening and closing movement within the passageway of the housing assembly.

Figure 2:
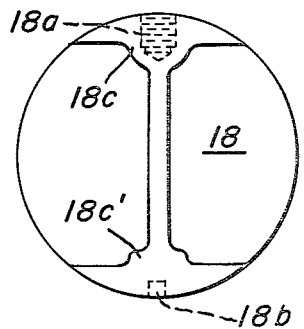
FIG. 2 is a side view of a throttle or butterfly valve element that may be employed in the overall construction of FIG. 1.
Figure 3:
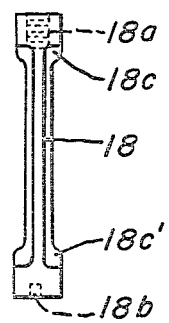
FIG. 3 is an end of edge view of the throttle element of FIG. 2.

The ball element 15 has a fluid-flow bore 15a therethrough that is adapted to operatively, rotatably receive the throttle or butterfly valve element 18 therein. The central, axially extending, inner stem 21 for the throttle valve element 18 is operatively carried within the outer, sleeve stem 25 and both extend through the boss 14 into the housing. The valve element 18 is shown of somewhat circular shape and may, as indicated in FIGS. 2 and 3, be reinforced at its upper and lower ends 18c and 18c' by thickening its body material thereat. The thickening of the end 18c provides a reinforced entry portion for a threaded bore 18a which is adapted to receive and carry a reduced, threaded, mounting end 21a of the inner stem 21. The thickening of the opposite end 18c' provides a reinforced entry portion for a small, circular recess or bore 18b that is adapted to rotate in a guided relation on a reduced pin end 19b of an inner, threaded set screw or pin 19. The inner stem 21 has a slightly larger diameter, smooth, cylindrical portion 21b that journals it within a smooth bore 15c of the ball element 15 and a smooth, central bore that extends through an enlarged, latching spline or tab end portion 25a of the outer, sleeve-like operating stem 25 for the valve ball element 15. At its upper end 21c, the inner stem 21 has a rectangular or wrench-flat portion for mounting a rectangular or nut-shaped hub 22a of a hand wheel 22 thereon.

The outer stem 25 serves to operatively carry and mount the ball valve element 15. As shown particularly in FIG. 1, the stem 25 terminates at its lowermost end in enlarged, latching spline or tab-like portion 25a which endwise-slidably fits within a complementary, outwardly open, latching slot 15c in the wall of the ball 15. Since the latching spline portion 25a is integral with the stem 25, it will be apparent that the valve illustrated is of a so-called bottom mounting type from the standpoint of the side boss 14 which mounts the pair of stems 21 and 25 to extend therethrough.

For increased accuracy and facility of operation, the butterfly valve element 18 is, at its end opposite the operating stem 21, provided with guide means which includes inner, threaded set screw or guide pin 19, and an outer, threaded pin or set screw 20 which is employed to lock the inner set screw 19 in position. As shown, the set screws are adapted to be threadably mounted within a threaded cross bore 15b through the wall of the ball element 15. As previously indicated, the inner screw 19 has a small circular tip end 19b which serves to rotatably carry a small complementary bore 18b of the butterfly throttle valve element 18 thereon. The inner set screw or guide pin 19 has a cross slot or screwdriver-receiving head 19a for adjusting it and the outer screw 20 has a similar head 20a.

As shown particularly in FIG. 1, the cylindrical main body of the inner stem 21 extends in a complementary, co-axial, rotatable relation along the main body of the outer stem 25 to project outwardly beyond and receive a suitable operating means, such as the hand wheel 22. A sealing group assembly of a stainless steel ring 27 and gasket ring 28 is shown positioned within an offset or groove within the bore of an upper end portion of the sleeve stem 25 to seal-off the joint defined with the stem 21 and, as furthered by an outwardly projecting, hollow, collar-like, externally threaded gland nut 26. It will be noted that threaded portion 26b of the gland nut 26 is adapted to be screwed-down in a tight relation within an enlarged, complementary, female threaded bore with an outer end portion 25b of the stem 25. The gland nut 26 is shown provided with an outwardly extending cylindrical portion 26a.

The intermediate portion of outer stem 25 has a sleeve-like gasket 23 thereabout which is mounted to extend along and within bore 14a of the boss 14. A stainless steel compression ring 24 fits within the upper end of the bore 14a to serve as a positioning means for the sleeve gasket 23. The upper end of the bore 14a terminates in an enlarged bore 14b to receive a Teflon sealing gasket 16 in an outermost position with respect to the ring 24. The bore 14b terminates in a threaded bore 14c of substantially the same diameter to removably receive a stainless steel, hollow, mounting collar nut 33 whose outer or male threads 33a enable it to be tightened-down within female threading of the bore 14c. A bearing sleeve or collar 32 of brass or other suitable material, such as stainless steel, is positioned to extend along the outer side of the stem 25 and the inside of the collar nut 33 and is latched within the collar 33 by an outwardly offset, lower, retention rim portion 32a.

Figure 4:
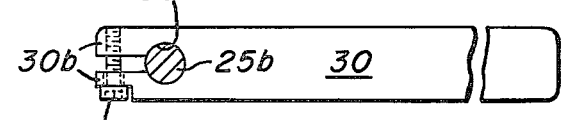
FIG. 4 is a plan view showing a handle for operating the valve ball of FIG. 1; this handle may be removably secured to an outer stem of a two-part stem assembly to control the operation of a valve ball.

Uppermost, stub or mounting portion end 25b of the outer stem 25 is of a circular shape of slightly reduced diameter to receive a suitable operating handle 30, see also FIG. 4. As shown in this figure, the stub or mounting end portion 25b is adapted to fit within a slit hole 30a of the handle 30. Split or bifurcated end portion 30b of the handle 30 is adapted to receive an Allen head clamping screw 31 for flexing and tightening it down to close the slot 30a tightly about the mounting end portion 25b and provide a non-turning, tight mounting of the handle 30 thereon.

It is possible and practical to use different materials for different elements in the construction. For example, the throttle or butterfly element 18 may be made of cemented carbide, while the ball element 15 and the stem and other parts may be made of stainless steel. The construction is such that the valve may be used to automatically compensate for flights or stages of flow such as involved in a system for a high-rise tower or apartment building. In a hydronic system, such as employed to supply water to a high rise building, a constant pressure may now be provided for each of the floors of the building. Controlling fluid pressure, of course, will result in a control of temperature, and vice versa.

The valve produced in accordance with the invention has been found to be very useful when viscous sludges and particles are being flowed in suspension through a pipe line system. Such particles tend to produce wear and tear on the valve parts. However, such wear and tear may be minimized in the present construction due to the flexibility in use of wear resistant parts, as above indicated. Another important feature is the fact that a so-called bottom entry recess type of ball element assembly, such as disclosed in my earlier U.S. application Ser. No. 853,120, filed Nov. 21, 1977 now U.S. Pat. No. 4,175,580 issued Nov. 27, 1979 and entitled "Bottom Entry Positive Acting Ball Valve", may be used. It may also be used as a fail-safe type of device.

Although not shown, it will be appreciated by those skilled in the art that the inner stem 21 which controls the operation of the butterfly element 18 may be operated by a conventional actuator or it may be controlled by a thermosensitive type of element. The present invention deals with the provision of a throttle valve 18 that can be operated manually, mechanically or automatically as may be required for a particular commercial application.

I claim:

1. An improved ball and throttle valve construction having a demountable housing assembly of interfitting body parts that define a through-extending fluid passageway therethrough which comprises, a ball valve having a fluid-flow bore open therethrough and being operatively positioned for rotative opening and closing movement within the fluid passageway, said ball having a latching recess portion in its outer wall, a side boss open through the housing assembly to said ball, a first stem operatively positioned to extend within said boss and having a latching spline at its inner end adapted to operatively engage within said latching recess portion, a second stem operatively extending co-axially along and outwardly from an outer end portion of said first stem and inwardly through said spline and the wall of said ball into said bore, a disc-like throttle valve element operatively extending across and within said bore for rotative movement therein, an inner end of said second stem being secured to said throttle valve element, said first and second stems having end portions projecting outwardly from said boss, operating means on said stems that are positioned outwardly of said boss for respectively turning them to rotate said ball within the passageway of the housing assembly and to rotate said throttle valve element within said bore, gland means operatively sealing said first and second stems within said boss, and detachable positioning means cooperating with the gland means for operatively retaining said first stem within said boss and second stem within the first stem enabling endwise removal of said first stem from said boss and said second stem from said first stem, said first stem being of sleeve-like construction and having a central bore extending through said latching spline, and said second stem extending along said central bore through the wall of and into said bore of said ball and having means for demountably securing said throttle valve element thereto.

2. An improved valve construction as defined in claim 1 wherein, a guide pin extends through the wall of said ball into its bore in an opposed relation with respect to an inner end of said second stem, and said guide pin has an inner end in positioning engagement with said throttle valve element for in cooperation with said second stem positively aligning said valve element for operative rotative movement within said bore.

3. An improved valve construction as defined in claim 2 wherein, said guide pin has a reduced cylindrical end portion in aligning engagement within said throttle valve for enabling guided rotative movement of said valve with respect thereto, and said guide pin has an outer threaded body portion that is adjustably positioned within the wall of said ball.

4. An improved valve construction as defined in claim 3 wherein a second pin has a threaded body portion adjustably positioned within the wall of said ball in alignment with an outer end of said guide pin to engage and lock said guide pin in an adjusted position within said ball.

5. An improved ball and throttle valve construction having a demountable assembly of interfitting body parts that define a through-extending fluid passageway therethrough which comprises, a ball valve having a fluid-flow bore open therethrough and operatively positioned for rotative opening and closing movement within the fluid passageway, said ball having a latching recess portion in its outer wall, a side boss open through the housing body parts assembly to said ball, a first stem operatively positioned for rotative opening and closing movement within the fluid passageway, said ball having a latching recess portion in its outer wall, a side boss open through the housing assembly to said ball, a first stem operatively positioned to extend within said boss and having a latching spline at its inner end adapted to operatively engage within said latching recess portion, a second stem operatively extending co-axially along and outwardly from an outer end portion of said first stem and inwardly through said spline and the wall of said ball into said bore, a disc-like throttle valve element operatively extending across and within said bore for rotatable movement therein, an inner end of said second stem being secured to said throttle valve element, a first operating means secured to an outer end portion of said first stem for rotating said ball within the passageway, a second operating means secured to said second stem adjacent to and outwardly of said first operating means for rotating said disc-like valve element within said bore, said bore being of uninterrupted diameter therealong and fully open with respect to the passageway of the housing body parts when said ball is rotated by said first stem into an aligned position therewith, gland means operatively sealing said first and second stems within said boss, and detachable positioning means cooperating with the gland means for operatively retaining said first stem within said boss and second stem within the first stem enabling endwise removal of said first stem from said boss and said second stem from said first stem, said first stem being of sleeve-like construction and having a central bore extending through said latching spline, and said second stem extending along said central bore through the wall of and into said bore of said ball and having means for demountably securing said throttle valve element thereto.

* * * * *